United States Patent
Gill et al.

Patent Number: 5,375,022
Date of Patent: Dec. 20, 1994

[54] MAGNETIC DISK DRIVE WITH ELECTRICAL SHORTING PROTECTION

[75] Inventors: Hardayal S. Gill, Portola Valley; David E. Heim, Redwood City, both of Calif.

[73] Assignee: International Business Machines Corporation, Armonk, N.Y.

[21] Appl. No.: 103,500

[22] Filed: Aug. 6, 1993

[51] Int. Cl.$^5$ .................................................. G11B 5/39
[52] U.S. Cl. ................................................................ 360/113
[58] Field of Search ........................................ 360/113

[56] References Cited

U.S. PATENT DOCUMENTS

| | | | |
|---|---|---|---|
| 4,939,837 | 7/1990 | Krounbi | 29/603 |
| 5,247,413 | 9/1993 | Shibata et al. | 360/113 |
| 5,272,582 | 12/1993 | Shibata et al. | 360/113 |

FOREIGN PATENT DOCUMENTS

0457278A2  5/1991  European Pat. Off. ........ G11B 5/39

*Primary Examiner*—John H. Wolff
*Attorney, Agent, or Firm*—Baker, Maxham, Jester & Meador

[57] ABSTRACT

A thin film magnetoresistive head is provided which has a magnetoresistive thin film sensing element. The film surfaces of the sensing element are bounded by top and bottom surfaces and a pair of side surfaces, the bottom surface forming a portion of an air-bearing surface. First and second sense current thin film lead layers are provided. The first lead layer is electrically connected to the top surface of the magnetoresistive element and the second lead layer is electrically connected to the bottom surface of the magnetoresistive element. First and second gap layers and first and second shield layers are provided. The magnetoresistive element is located between the first and second gap layers. The magnetoresistive element, the lead layers, and the first and second gap layers are located between the first and second shield layers. Provision is made for electrically connecting the second lead layer to the second shield layer and provision is made for electrically connecting the first and second shield layers. With this arrangement, shorting between the layers at the air-bearing surface of the head is overcome. Further, by proper electrical connection of these components to a turntable, electrical shorting between the head, at the air-bearing surface, and the surface of a magnetic disk rotating therebelow is overcome.

22 Claims, 6 Drawing Sheets

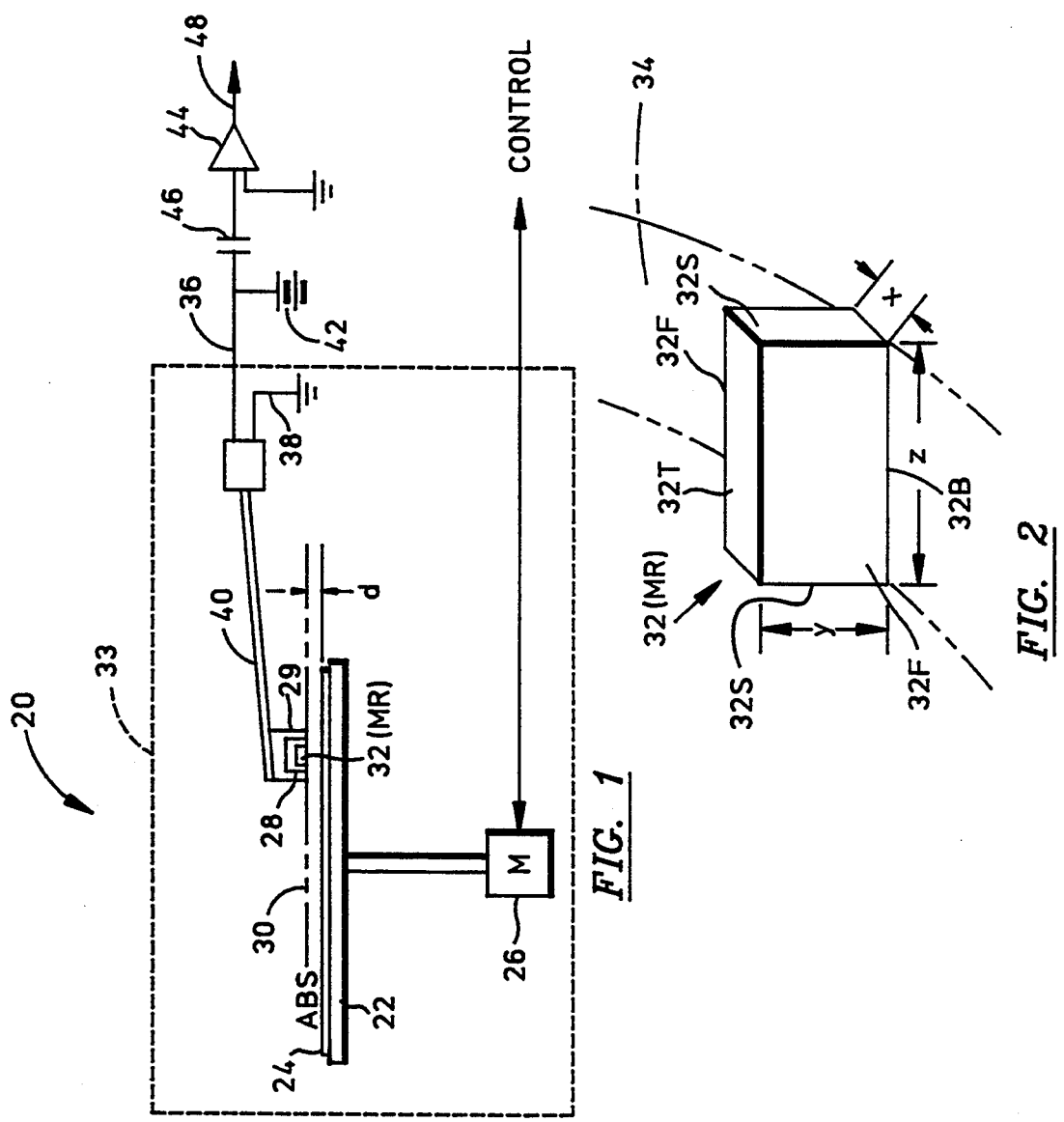

MAGNETIC DISK DRIVE WITH ELECTRICAL SHORTING PROTECTION

BACKGROUND OF THE INVENTION

1. Field of the Invention

The present invention relates to an improved magnetic disk drive and more particularly to a thin film magnetoresistive head in the disk drive which is protected from: (1) electrical shorting across its thin film layers at an air-bearing surface, and (2) electrical shorting between its thin film layers at the air-bearing surface and a disk rotating therebelow.

2. Discussion of the Related Art

In the electromagnetic recording arts, thin film flux sensing heads are more desirable than inductive heads because of their higher areal density capability. They are also easier to manufacture. With various thin film manufacturing techniques, they can be fabricated in batches on a substrate and then cut into individual units. A read head employs a magnetoresistive element which changes resistance in response to magnetic flux density from a rotating magnetic disk or a moving magnetic tape. A sensing current, which is passed through the magnetoresistive element, varies proportionally to the change in resistance of the magnetoresistive element. The linear response of the magnetoresistive element is based on how well the resistance change of the magnetoresistive element follows the change in flux density sensed from the magnetic medium. In a disk or tape drive, a differential preamplifier is connected to the magnetoresistive element for processing the output signals from the read head.

The magnetoresistive element is a thin film layer which has its thin film faces bounded by top and bottom edges and side edges. The bottom edge, which is elongated, forms a part of an air bearing surface which flies above the plane of a magnetic disk, for example, when the disk is rotated. The magnetoresistive element is sandwiched between a pair of gap (insulation) layers which in turn are sandwiched between a pair of shield layers. The distance between the shield layers is called the gap. The smaller the gap, the greater the resolution of the MR head. The magnetic field is applied along an "easy" axis of the magnetoresistive material to improve its stability (reduction of Barkhausen noise).

One of the most desirable materials for the shield layers in a thin film magnetoresistive read head is nickel-iron (NiFe). The NiFe material is easy to fabricate and does not generate magnetic noise. However, the use of this material for the shield layers causes several problems. During fabrication of the thin film read head, it is difficult to prevent smearing of conductive material across the gap layers which separate the magnetoresistive element from the shield layers. This causes electrical shorting between the shield layers and the magnetoresistive layer at the air-bearing surface. This shorting reduces head resistances and signal amplitudes. Another problem is that it is not unusual for some portion of the head at the air-bearing surface to be at a different potential than that magnetic disk rotating therebelow. This causes a high probability of electrical arcing between the head and the disk. Both of these problems are aggravated when the flying height between the head at the air-bearing surface and the rotating magnetic disk is reduced to contact or near-contact.

The first problem of electrical shorting between the shield layers and the magnetoresistive element is overcome in the prior art by constructing one of the shield layers of Sendust. This material has two problems. The first problem is that it requires special processing during fabrication of the read head. A second problem is that it generates magnetic noise which makes quality testing of the read head difficult to perform. In contrast, shield layers constructed from the NiFe material are free from these problems. In order to construct the shield layers from NiFe the aforementioned problems need to be solved, namely: (1) shorting between the shield layers and the magnetoresistive layer at the air-bearing surface and (2) shorting between the read head at the air-bearing surface and the magnetic disk rotating therebelow.

SUMMARY OF THE INVENTION

The present invention provides a thin film magnetoresistive read head with shield layers constructed of NiFe which is free of the aforementioned problems. The magnetic read head includes a thin film magnetoresistive sensing element which has its film surfaces bounded by top and bottom edges and a pair of side edges, the bottom edge forming a portion of an air-bearing surface. First and second sense current thin film conductive lead layers are provided. The first lead layer is electrically connected to the top edge of the magnetoresistive element and the second lead layer is electrically connected to the bottom edge of the magnetoresistive element. First and second thin film gap layers and first and second thin film shield layers are provided. The magnetoresistive element is located between the first and second gap layers. The magnetoresistive element, the lead layers and the first and second gap layers are located between the first and second shield layers. Provision is made for electrically connecting the second lead layer to the second shield layer, and provision is made for electrically connecting The first and second shield layers. With these provisions, electrical shorting of the shield layers with respect to the magnetoresistive element at the air-bearing surface is overcome. The other problem is electrical shorting between the read head, at the air-bearing surface, and the surface of a magnetic disk rotating therebelow. This problem is overcome by electrically connecting the shield layers of the read head to the turntable, such as by grounding these components.

An object of the present invention is to overcome the problem of electrical shorting between the shield layers and the magnetoresistive element at the air-bearing surface of a read head due to smearing of conductive material across this air-bearing surface during fabrication of the head.

Another object is to overcome the problem of electrical shorting between the layers of a thin film magnetoresistive read head at the air-bearing surface and the surface of a magnetic disk rotating therebelow.

A further object is to provide a thin film magnetoresistive read head which will not short across the air-bearing surface of the read head or short between the air-bearing surface and a magnetic disk rotating therebelow.

Still another object is to accomplish the foregoing object with at least one of the shield layers made of NiFe.

Still a further object is to accomplish the foregoing objects with a single thin film magnetoresistive element with a provision for longitudinally and transversely biasing the element to improve its performance.

Still another object is to accomplish any of the aforementioned objects with a thin film magnetoresistive read head which can be easily fabricated.

Still a further object is to provide a disk drive which includes a thin film magnetoresistive read head which is free of electrical shorting problems between its components and/or between the read head and a magnetic disk rotating therebelow.

Other objects will become apparent when considered in light of the following description of the invention.

BRIEF DESCRIPTION OF THE DRAWINGS

FIG. 1 is a schematic illustration of a magnetic disk drive employing the thin film magnetoresistive read head of the present invention.

FIG. 2 is a schematic illustration of a single thin film magnetoresistive element portion of the read head with respect to a single track of a magnetic disk.

DETAILED DESCRIPTION OF THE PREFERRED EMBODIMENTS

Figure 3:
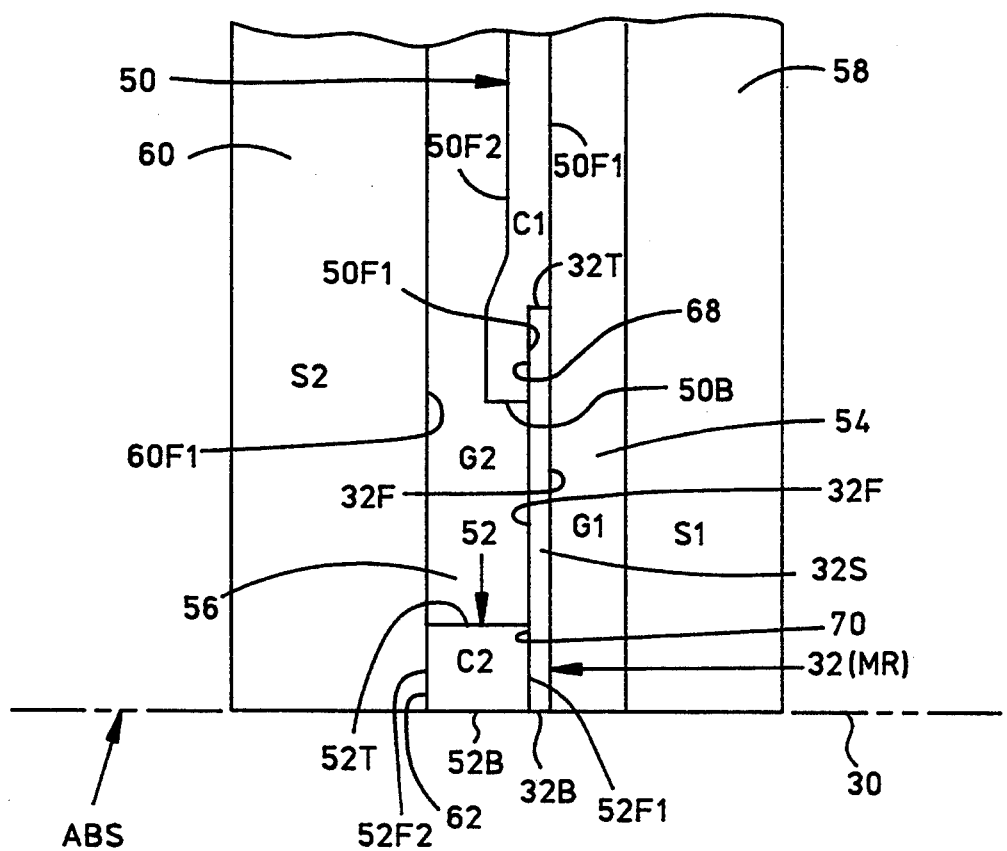
FIG. 3 is a schematic side view partly of a central portion of some of the thin film layers of the present read head.

Referring now to the drawings wherein like reference numerals designate like or similar parts throughout the several views, there is illustrated in FIG. 1 a magnetic disk drive 20 which includes a turntable 22 for rotating a magnetic disk 24. The turntable 22 is rotated by a motor 26 which is responsive to control signals from a drive control source (not shown). When the magnetic disk 24 is rotated by turntable 22, a magnetic head 28, which is mounted on a slider (substrate) 29, is supported above the plane of the magnetic disk 24 by an air bearing. Bottom surfaces of the slider 29 and the head 28 are in a plane which is called the air bearing surface. The air bearing surface 30 is spaced above the top plane of the magnetic disk 24 by a distance d when the magnetic disk is rotating. The magnetic head 28 includes a thin film magnetoresistive element 32. All of these components are mounted in a disk housing 33 which may include other disks and heads (not shown). In FIG. 2 the magnetoresistive element 32 is shown in relationship to a single track 34 of the magnetic disk 24. The magnetoresistive element 32 has a pair of oppositely directed thin film surfaces 32F which are bounded by top and bottom edges 32T and 32B, and side edges 32S. The bottom edge 32B, which is elongated with a length z and a width x, forms a portion of the air bearing surface 30. As shown in FIG. 2, the magnetoresistive element 32 has a height y.

The magnetoresistive element 32 is a thin film material, such as nickel iron (NiFe), which changes resistance proportionately to the degree of flux density sensed by the element 32 as the track 34 of the magnetic disk 24 rotates below the air bearing surface 30. The accuracy to which the resistance of the magnetoresistive element 32 follows the changing flux densities from the magnetic disk track 34 determines the linear response of the magnetoresistive element 32. A pair of conductors 36 and 38 are connected to the magnetoresistive element 32 via an arm 40 which mounts the slider 29. Connected to the conductors 36 and 38 is a current source 42 for applying a sense current to the magnetoresistive element 32. In order to detect resistance changes of the magnetoresistive element, a sense current is imposed. The current is passed through the magnetoresistive element perpendicular to the plane of the magnetic disk 24. One of the conductors 38 may be grounded. The other conductor 36 connects to a preamplifier 44 via a capacitor 46. During a read mode of operation, sense current variations are provided to the preamplifier 44 by way of the conductor 36. The output of the preamplifier 44 at 48 is an amplified signal representative of the flux densities sensed by the magnetoresistive element 32 from the rotating magnetic disk 24.

As shown in FIG. 2, the track 34 travels broadside to the magnetoresistive element 32. Accordingly, the length z of the magnetoresistive element 32 extends laterally across the width of the track 34. The effective length z determines the track width which will be sensed by the magnetoresistive element 32. The resolution of the magnetoresistive element 32 depends upon the width of the gap of the magnetoresistive head 28. The width of the gap, in turn, depends upon the thickness of the gap layers which insulate the thin film surfaces 32F of the magnetoresistive element from the shield layers plus the thickness x of the magnetoresistive element 32 (see FIG. 2). The gap layers will be described in detail hereinafter. The shield layers in essence focus the sensing capabilities of the magnetoresistive element 32 within a confined area of the track 34 of the disk 24 (see FIGS. 1 and 2). The thinner the gap layers, the more confined this area is and the greater the resolution of the magnetoresistive element 32.

Figure 4:
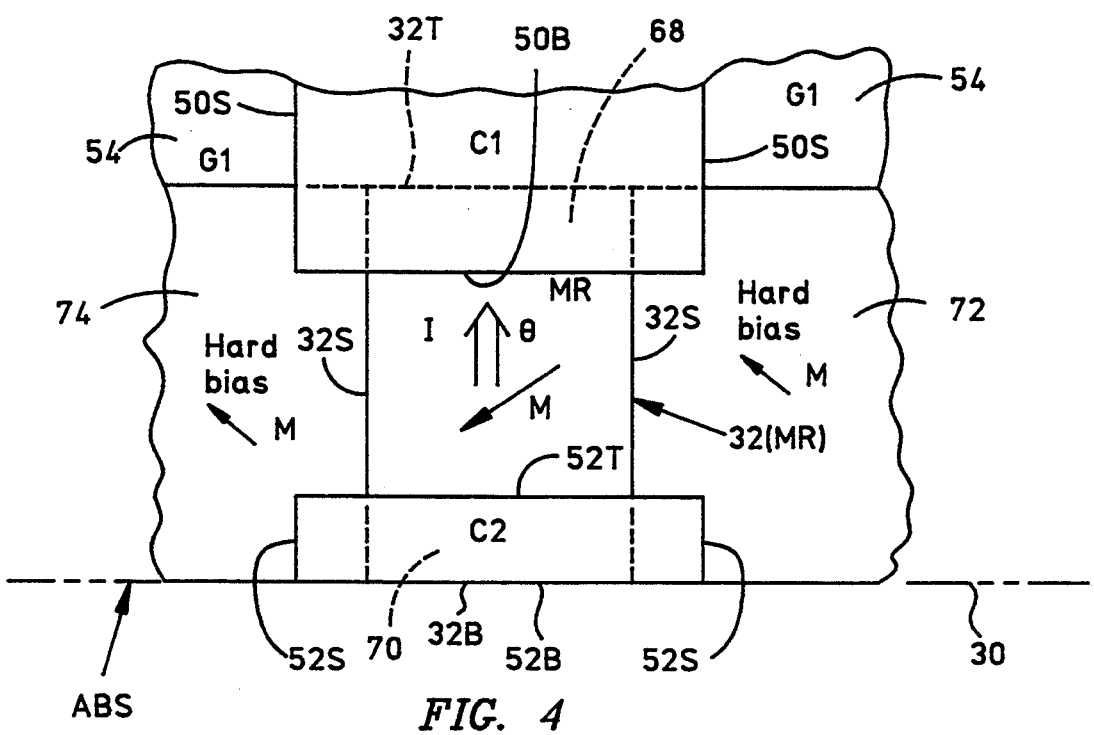
FIG. 4 is a schematic thin film surface planar view of FIG. 3 with the second gap layer and the second shield layers removed.

As shown in FIGS. 3 and 4, first and second sense current thin film lead layers 50 and 52 are provided. The first lead layer 50 is electrically connected to the top edge 32T of the magnetoresistive element and the second lead layer 52 is electrically connected to the bottom edge 32B of the magnetoresistive element. First and second thin film gap layers 54 and 56 and first and second thin film shield layers 58 and 60 are provided. The magnetoresistive element 32 is located between the first and second gap layers 54 and 56. The magnetoresistive element 32, the lead layers 50 and 52 and the first and second gap layers 54 and 56 are located between the first and second shield layers 58 and 60. All of these layers may be fabricated in a direct thin film surface-to-thin film surface engagement.

Figure 6:
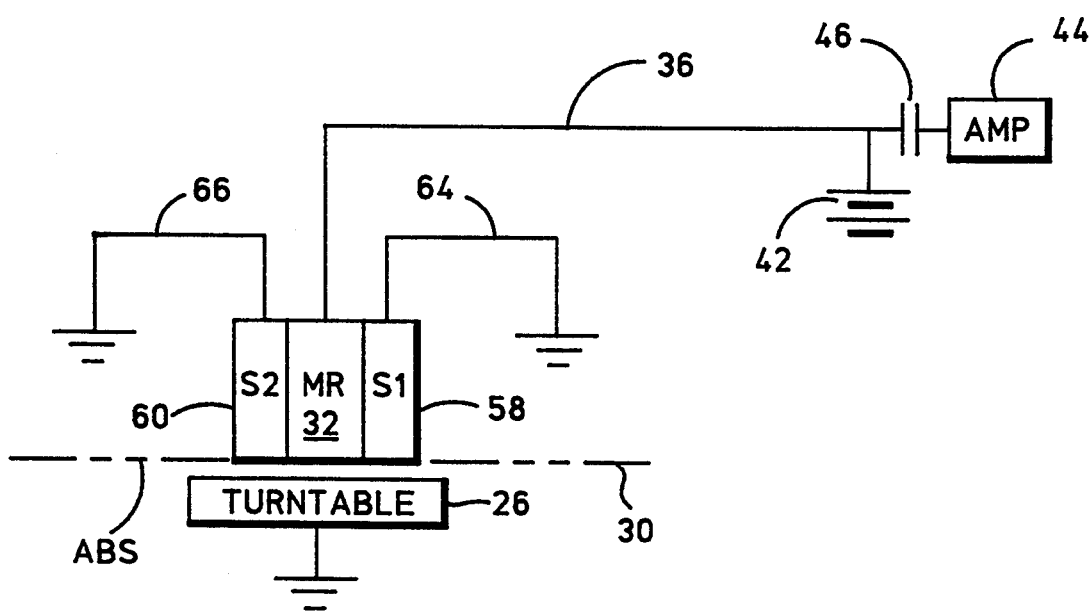
FIG. 6 is a block diagram of exemplary electrical connections of the present invention.

Means are provided for electrically connecting the second lead layer 52 to the second shield layer 60. This electrical connection, which may occur by direct interfacial engagement at 62, will be discussed in more detail hereinafter. Means are also provided for electrically connecting the first shield layer 58 to the second shield layer 60, an example of such connecting means being illustrated in the block diagram of FIG. 6. In FIG. 6, the first shield layer 58 is shown connected to ground by a conductor 64 and the second shield layer 60 is shown connected to ground by a conductor 66 which is the same as conductor 38 in FIG. 1. The turntable 26 is also connected to ground so as to achieve the purposes of the present invention. With the first and second shield layers 58 and 60 electrically connected to one another, electrical shorting effects between the shield layers and the magnetoresistive element at the air-bearing surface 30 are eliminated. Further, since the shield layers 58 and 60, and the turntable 26 are all electrically connected by grounding, arcing between the thin film layers of the head at the air-bearing surface 30 and the surface of a magnetic disk 24 rotating therebelow on the turntable 26 is eliminated.

As shown in FIGS. 3 and 4, one of the thin film surfaces 32F of the magnetoresistive element has first and second spaced apart thin film surface portions 68 and 70. The first film surface portion 68 is adjacent the top edge 32T of the magnetoresistive element and the second film surface portion 70 is adjacent the bottom edge 32B of the magnetoresistive element. Each thin film surface portion 68 and 70 extends from side edge 32S to side edge 32S of the magnetoresistive element. The first lead layer 50 has first and second oppositely facing thin film surfaces 50F1 and 50F2 bounded by top and bottom edges, the bottom edge 50B being shown in FIGS. 3 and 4, and the side edges 50S being shown in FIG. 4. As shown in FIGS. 3 and 4, the second lead layer 52 has oppositely-facing thin film surfaces 52F1 and 52F2 which are bounded by top and bottom edges 52T and 52B and side edges 52S. The first thin film surface 50F1 of the first lead layer directly engages the first film portion 68 of the magnetoresistive element and the first film surface 52F1 of the second lead layer directly engages the second film portion 70 of the magnetoresistive element. As shown in FIG. 3, the first lead layer 50 may also directly engage the top edge 32T of the magnetoresistive element.

The second shield layer 60 may have first and second oppositely-facing thin film surfaces, the first film surface 60F1 being shown in FIG. 3. As shown in FIG. 3, the means for connecting the second lead layer 52 to the second shield layer 60 may include connecting the second film surface 52F2 of the second lead layer directly to the first film layer 60F1 of the second shield layer in a direct thin film surface-to-thin film surface engagement. It should be understood that while this is the preferred arrangement for connecting the second lead 52 to the second shield layer 60 that other provisions can be made for making this connection. For instance, if the second lead layer 52 is made thinner than the second gap layer 56, a via could be provided from the second shield layer 60 through the second gap layer 56 to the second lead layer 52 to make the electrical connection.

It should be noted that the bottom edge 52B of the second lead layer forms a portion of the air-bearing surface 30 of the head. This ensures that The second lead layer 52 makes electrical contact with the bottom edge 32B of the magnetoresistive element. In the preferred embodiment, the thin film thickness of she second lead layer 52 is equal to the film thickness of the second gap layer 56. In contrast, the first lead layer 50 is located between the first and second gap layers 54 and 56 and has a film thickness which is less than the thin film thickness of the second lead layer 52. With this arrangement, the second gap layer 56 insulates the first lead layer 50 from the second shield layer 60 so that the lead layer 50 can provide a signal to the amplifier 42 (see FIGS. 1 and 6).

As shown in FIGS. 3 and 4, the magnetoresistive element 32 may be a single film layer which has an elongated bottom edge 32B which extends along the air-bearing surface 30. It is desirable that this magnetoresistive element 32 be properly biased to improve its performance. In the embodiment shown in FIGS. 3 and 4 the easy axis of the magnetoresistive element is parallel to the air bearing surface 30 and perpendicular to the sense current I. An exemplary biasing arrangement may include a pair of thin film hard bias layers 72 and 74 which are located on each side edge 32S of the magnetoresistive element in the same plane therewith. Each layer is permanently magnetized in a direction (shown by the arrows in FIG. 4) which is canted to the easy axis of the magnetoresistive element 32. The transverse fields from the hard bias layers 72 and 74 cant the direction of the magnetization of the magnetoresistive element 32 along the arrow shown in FIG. 4, the angle between this arrow and the direction of current flow I being the bias angle $\Theta$. The angle $\Theta$ is preferably about 45 degrees. With this bias angle, the response of the magntoresistive element 32 to flux densities from a disk rotating therebelow is more linear. The horizontal component of the field from the layers 72 and 74 stabilizes the response of the magnetoresistive element. This is done by reducing domain walls within the element. Domain walls make noise (Barkhausen noise) when they move erratically in the magnetoresistive element 32.

Figure 5:
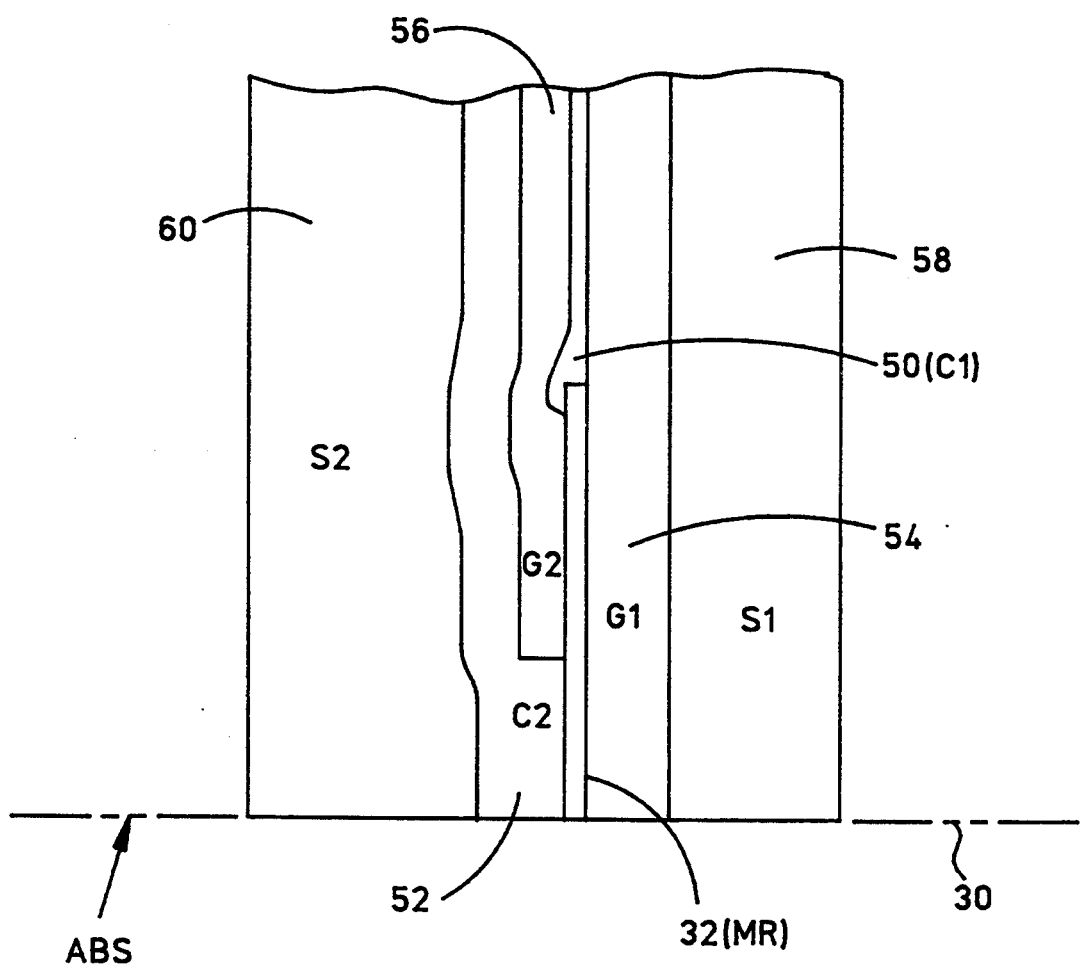
FIG. 5 is a schematic side illustration of the central portion of the thin film layers of a slightly modified embodiment of the present read head.

FIG. 5 is another embodiment of the present invention which differs slightly from the embodiment in FIGS. 3 and 4. The only difference between the FIG. 5 embodiment and the FIGS. 3 and 4 embodiment is that the lead layer 52 is sandwiched between the second gap layer 56 and the second shield layer 60 in direct thin film surface to thin film surface engagement. The FIG. 5 embodiment may be preferred since it may be easier to construct than the FIGS. 3 and 4 embodiment. An exemplary construction of the FIG. 5 embodiment is set forth in the following paragraph.

Figure 7:
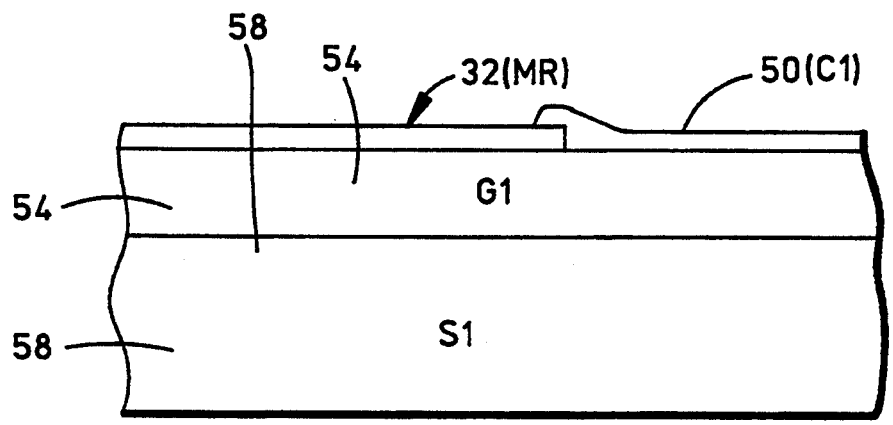
FIGS. 7 through 11 are schematic side illustrations of various steps in the fabrication of the thin film layers of the central portion of the present read head.
Figure 8:
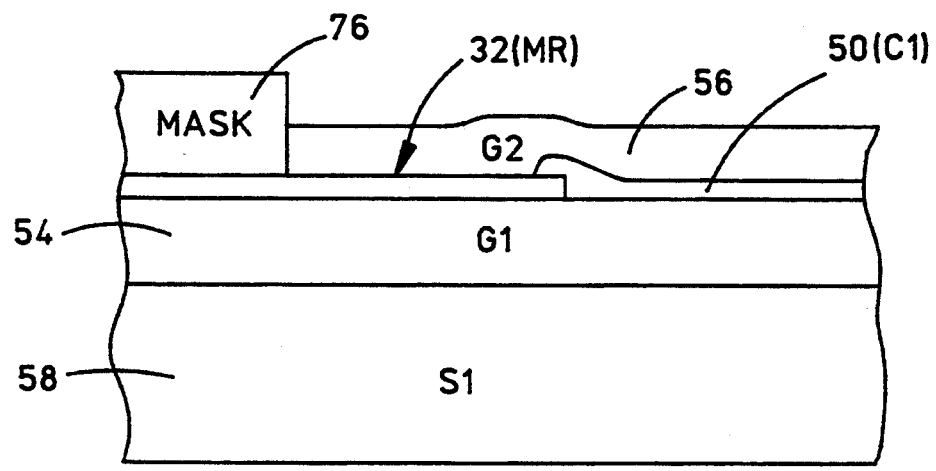
Figure 9:
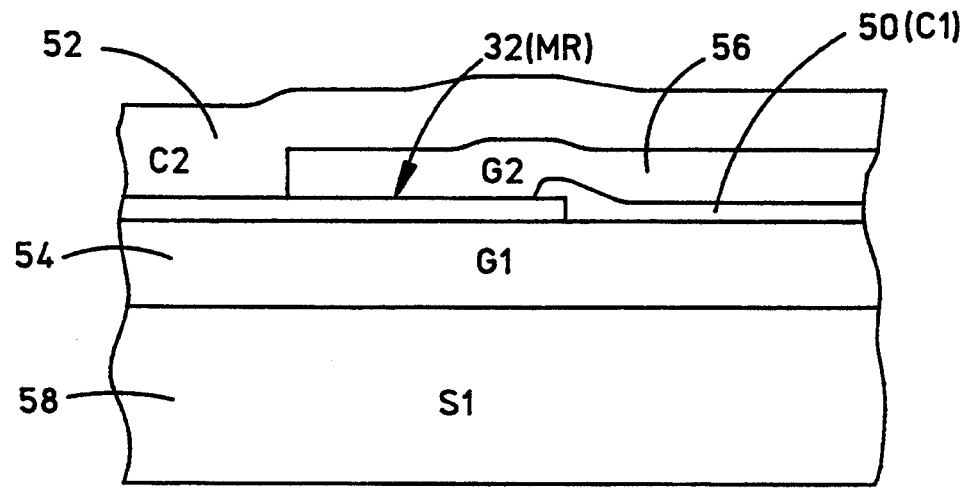
Figure 10:
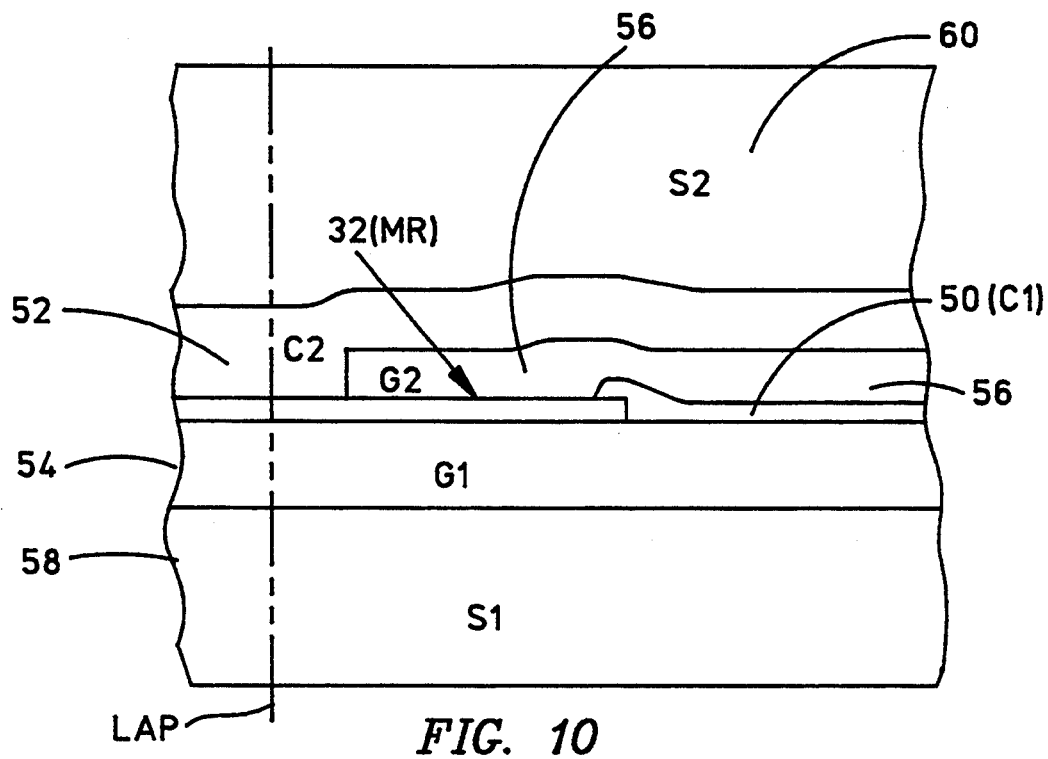
Figure 11:
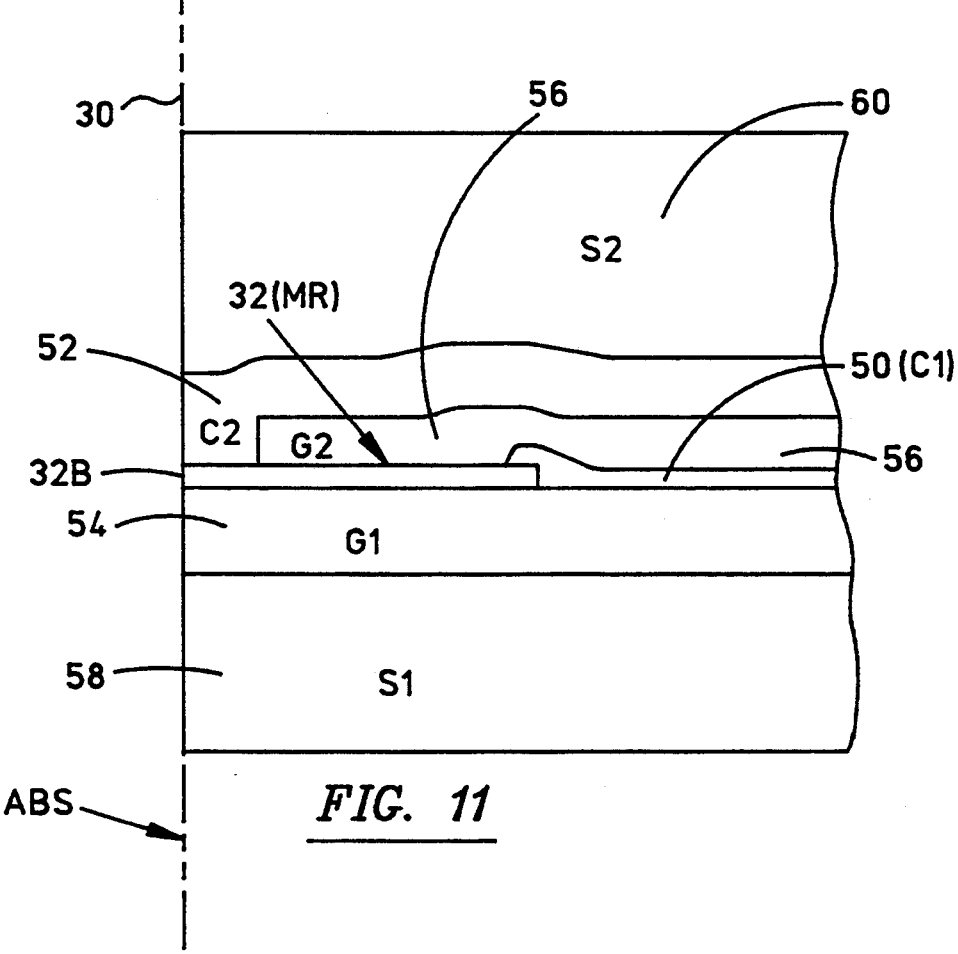

The first step in the construction of the FIG. 5 embodiment of the present invention is shown in FIG. 7. The first shield layer 58, the first gap layer 54, the magnetoresistive element layer 32 and the first lead layer 50 are deposited on one or more layers therebelow, such as a substrate (not shown), using conventional masking and deposition techniques. As shown in FIG. 8, the second gap layer 56 is deposited through a mask 76 to insure that the air-bearing surface 30 (see FIG. 11) portion of the read head is not covered by the second gap material. As shown in FIG. 9, the mask 76 has been removed and the second insulation layer 56 is used as a mask for deposition of the second lead layer 52. As shown in FIG. 10, the second shield layer 60 is then deposited on top of the second lead layer 52. After deposition is complete, the head is lapped, as shown in FIG. 11, at the dashed line 30 which forms the air-bearing surface 30 and the final crosssection of the read head.

It should be noted that the thickness of the second lead layer 52 separates the magnetoresistive film 32 and the second shield layer 60 at the air-bearing surface 30. This thickness should be chosen to provide a narrow gap for the magnetoresistive element 32, namely the distance between the shield layers 58 and 60 so as to maximize the resolution of the read head. With this arrangement the second gap layer 56 is thinner than the first gap layer 54.

It is now readily apparent that the present invention provides an improved thin film magnetoresistive head and drive which does not suffer from electrical shorting or arcing problems. Even though there is a slight smearing of conductive material across the air-bearing surface portion of the head electrical shorting between the shield layers and the magnetoresistive element, this is of no consequence to operation of the head. Further, by electrically connecting the shield layers to the turntable, electrical shorting or arcing between the head at the air-bearing surface to the magnetic disk is overcome.

For further information on various aspects of the present invention reference is made to co-pending U.S. patent application Ser. No. 08/103,487, filed on Aug. 6, 1993, concurrently with the present patent application by Harry S. Gill and David Heim, which patent application is incorporated by reference herein.

Obviously, many modifications and variations of the present invention are possible in light of the above teachings. It is therefore to be understood that, within the scope of the appended claims, the invention may be practiced other than as specifically described.

We claim:

1. A magnetic disk drive comprising:
   a magnetoresistive element having first and second thin film surfaces bounded by top and bottom edges and a pair of side edges, the bottom edge forming a portion of an air bearing surface;
   first and second sense current thin film lead layers, the first lead layer being electrically connected to the top edge of the magnetoresistive element and the second lead layer being electrically connected to the bottom edge of the magnetoresistive element;
   the second lead layer having a bottom edge which forms a portion of the air bearing surface;
   first and second thin film gap layers and first and second thin film shield layers:
   the magnetoresistive element being located between the first and second gap layers;
   the magnetoresistive element, the lead layers and the first and second gap layers being located between the first and second shield layers;
   a turntable for supporting a magnetic disk; and
   connecting means for electrically connecting the first and second lead layers, the first and second shield layers and the turntable to equal electrical potential,
   whereby electrical shorting between the magnetoresistive element and a magnetic disk rotated by the turntable is substantially eliminated.

2. A disk drive as claimed in claim 1 wherein the connecting means includes:
   the second lead layer and the second shield layer each having first and second thin film surfaces, the first and second thin film surfaces of the second lead layer being bounded in part by said bottom edge of the second lead layer;
   the second thin film surface of the second lead layer directly engaging the first thin film surface of the second shield layer; and
   the first thin film surface of the second lead layer directly engaging the second thin film surface of the magnetoresistive element.

3. A disk drive as claimed in claim 1 including:
   the magnetoresistive element being a single film which has an easy axis which is substantially parallel to the air bearing surface;
   first and second hard bias layers, the first hard bias layer directly engaging the first side edge of the magnetoresistive element and the second hard bias layer directly engaging the second edge of the magnetoresistive element; and
   each hard bias layer being permanently magnetized along a respective vector which is at an acute angle to the air bearing surface for biasing magnetization of the magnetoresistive element at an acute angle to the easy axis.

4. A disk drive as claimed in claim 1 including:
   said equal electrical potential being ground potential.

5. A disk drive as claimed in claim 1 including:
   the second thin film lead layer being thicker than the first thin film lead layer.

6. A disk drive as claimed in claim 1 including:
   the first lead layer directly engaging the top edge of the magnetoresistive element and extending therefrom in a direction away from the air bearing surface.

7. A disk drive as claimed in claim 1 including:
   a portion of the magnetoresistive element being located between a portion of the first lead layer and the first gap layer.

8. A disk drive as claimed in claim 7 including:
   the second lead layer being thicker than the first lead layer.

9. A disk drive as claimed in claim 8 including:
   the first lead layer directly engaging the top edge of the magnetoresistive element and extending therefrom in a direction away from the air bearing surface.

10. A disk drive as claimed in claim 9 including:
    the magnetoresistive element being a single film which has an easy axis which is substantially parallel to the air bearing surface;
    first and second hard bias layers, the first hard bias layer directly engaging the first side edge of the magnetoresistive element and the second hard bias layer directly engaging the second side edge of the magnetoresistive element; and
    each hard bias layer being permanently magnetized along a repetitive vector which is at an acute angle to the air bearing surface for biasing magnetization of the magnetoresistive element at an acute angle to the direction of the easy axis.

11. A disk drive including the thin film magnetoresistive head of claim 10, the disk drive including:
    said equal electrical potential being ground potential.

12. A disk drive as claimed in claim 1 including:
    the second thin film surface of the magnetoresistive element having first and second portions, the first thin film surface portion being adjacent the top edge of the magnetoresistive sensing element and the second thin film surface portion being adjacent the bottom edge of the magnetoresistive element, each film surface portion extending from side edge to side edge of the magnetoresistive element; and
    the first and second lead layers having first and second oppositely facing thin film surfaces bounded by top and bottom edges and side edges, the first thin film surface of the first lead layer directly engaging the first thin film portion of the magnetoresistive element and the first thin film surface of the second lead layer directly engaging the second thin film portion of the magnetoresistive element.

13. A disk drive as claimed in claim 12 including:
    the second shield layer having oppositely facing thin film surfaces; and
    the interconnecting means including the second thin film surface of the second lead layer directly engaging one of the thin film surfaces of the second shield layer.

14. A disk drive as claimed in claim 13 including:
said same electrical potential being ground potential.

15. A disk drive as claimed in claim 14, the disk drive including:
a housing;
the turntable being mounted in the housing for supporting and rotating a magnetic disk about a central axis which is perpendicular to the air bearing surface; and
a support, including a slider, mounted in the housing for supporting the magnetoresistive element in an operative relationship with respect to a magnetic disk mounted on the turntable.

16. A disk drive as claimed in claim 14 including:
the magnetoresistive element being a single film which has an easy axis which is substantially parallel to the air bearing surface; and
a hard bias layer adjacent each side edge of the magnetoresistive element for biasing magnetization of the magnetoresistive element at an acute angle to the easy axis.

17. A magnetic disk drive as claimed in claim 16 including:
each hard bias layer being permanently magnetized along a vector which extends substantially at a 45° angle to the air bearing surface.

18. A thin film magnetoresistive head as claimed in claim 14 including:
a portion of the magnetoresistive element being located between a portion of the first lead layer and the first gap layer.

19. A thin film magnetoresistive head as claimed in claim 17 including:
the second thin film lead layer being thicker than the first thin film lead layer.

20. A thin film magnetoresistive head as claimed in claim 19 including:
the first lead layer directly engaging the top edge of the magnetoresistive element.

21. A disk drive as claimed in claim 21 including:
a housing;
the turntable being mounted in the housing for supporting and rotating the magnetic disk about a central axis which is perpendicular to the air bearing surface; and
a support, including a slider, mounted in the housing for supporting the magnetoresistive element in an operative relationship with respect to a magnetic disk mounted on the turntable.

22. (Amended) A disk drive as claimed in claim 22 including:
the first lead layer having a thickness which is less than the thickness of the second gap layer and the second lead layer having a thickness which is substantially equal to the thickness of the second gap layer.

* * * * *

UNITED STATES PATENT AND TRADEMARK OFFICE
CERTIFICATE OF CORRECTION

PATENT NO. : 5,375,022
DATED : December 20, 1994
INVENTOR(S) : Gill et al.

It is certified that error appears in the above-indentified patent and that said Letters Patent is hereby corrected as shown below:

Column 2, line 37, change "The" to --the--.

Column 7, lines 40 and 41, delete "first and" and change "layers" to --layer--.

Column 8, line 39, change "repetitive" to --respective--;
lines 43 and 44, delete "including the thin film magnetoresistive head of" and insert therefor --as claimed in--;
line 44, delete "the disk drive".

Column 9, line 27, delete "magnetic".

Column 10, line 1, change "thin film magnetoresistive head" to --disk drive--;
line 6, change "thin film magnetoresistive head" to --disk drive--;
line 10, change "thin film magnetoresistive head" to --disk drive--;
line 14, change the second occurrence of "21" to --20--.
line 24, delete "(Amended)" and change the second occurrence of "22" to --21--.

Signed and Sealed this

Thirtieth Day of May, 1995

Attest:

BRUCE LEHMAN

*Attesting Officer*     *Commissioner of Patents and Trademarks*